Oct. 6, 1964
L. TROY
3,151,709
BRAKE DRUM
Filed July 10, 1962
2 Sheets-Sheet 1
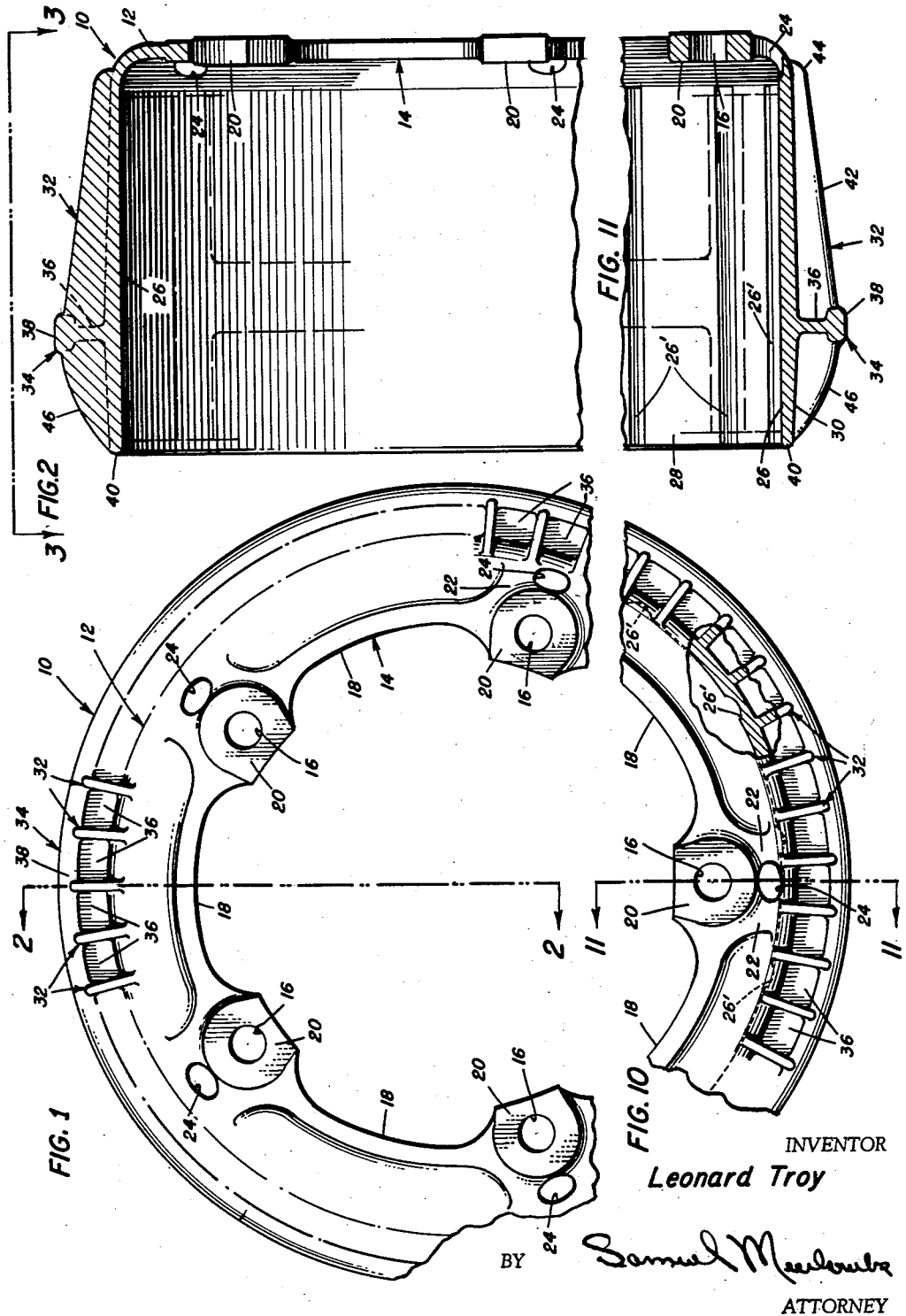
INVENTOR
*Leonard Troy*
BY
ATTORNEY

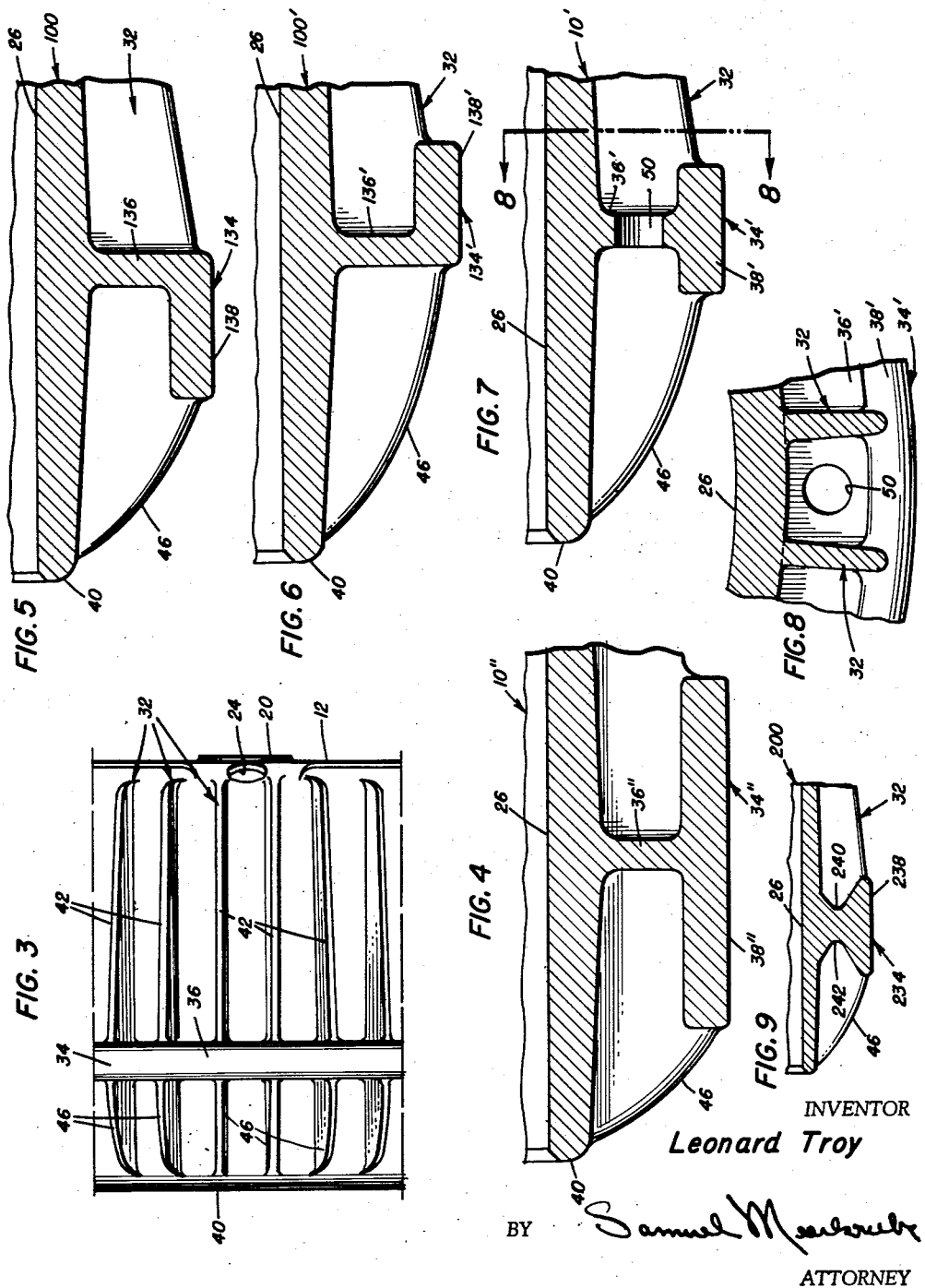
Oct. 6, 1964     L. TROY     3,151,709
BRAKE DRUM
Filed July 10, 1962     2 Sheets-Sheet 2
INVENTOR
Leonard Troy
BY
ATTORNEY

United States Patent Office 3,151,709
Patented Oct. 6, 1964

3,151,709
BRAKE DRUM
Leonard Troy, 5 Pen-Y-Bryn Drive, Scranton, Pa.
Filed July 10, 1962, Ser. No. 208,814
11 Claims. (Cl. 188—218)

This invention relates to an improved brake drum, and particularly to a brake drum which affords better braking characteristics per pound of metal used.

There is a constant search in the vehicle industry to reduce the weight of various components in order that the maximum amount of power can be utilized to haul a "pay load." Automotive vehicles, especially tractor and trailer rigs, have in the past used relatively large cast iron brake drums which are of a considerable mass and weight.

During a brake application, a tremendous amount of heat is generated due to frictional contact between the brake shoes and drums. During a brake application, especially under emergency conditions at very high speeds, after the brakes are applied, there occurs a phenomenon conventionally described as "fade" where, due to various factors in addition to the tremendous heat generated, after a predetermined increment of brake application, the brakes become ineffective generally in relation to the amount of time they have been applied.

Additionally, the heat produced during a brake application causes tremendous internal stresses on the brake drums, and together with sudden cooling results in warpage, metal fatigue, etc.

It has generally been the practice in the past to construct brake drums of considerable mass to resist warpage, however, the relatively large mass results in the retention of heat and early brake "fade" conditions. Further, since heat has been known to be a deleterious factor to good braking efficiency, various means have been provided to conduct the heat away from the drums, i.e., peripheral fins, apertures in selected drum areas, etc.

A primary object of the present invention is to provide a novel brake drum which permits the use of less material than heretofore thought possible in addition to providing structural reinforcement at the critical expansion area of the drum, which in combination with cooling fins will by convection rapidly and readily conduct heat away from the drum to maintain brake "fade" within prescribed and desirable safe limits.

Another object of the present invention is to provide in a brake drum a reduced "cantilever" overhang on the brake drum, as compared with conventional drums, as well as providing reinforcement generally in the area of maximum internal load concentration during a brake application whereby the factors of weight and strength of the drum are respectively at a minimum and maximum.

A further object of the present invention is to provide a novel brake drum which includes a construction affording minimum weight, maximum strength and a maximum braking efficiency without perceptible brake "fade."

A still further object of the present invention is to provide inner peripheral expansion means on a brake drum which compensates for extreme internal heat and expansion, and tends to maintain expansion within maximum permissible limits to afford maximum braking drum-to-shoe contact with or without external drum cooling expedients.

With the above and other objects in view that will hereinafter appear, the nature of the invention will be more clearly understood by reference to the following description, the appended claims and the several views illustrated in the accompanying drawings:

In the drawings:

FIGURE 1 is a face view of a brake drum incorporating the features of the invention, looking from right to left at FIGURE 2;

FIGURE 2 is a vertical section taken on the plane of line 2—2 of FIGURE 1;

FIGURE 3 is a fragmentary end view looking from line 3—3 of FIGURE 2;

FIGURE 4 is an enlarged, fragmentary section showing a modified reinforcing rib of the novel brake drum;

FIGURE 5 is a view similar to FIGURE 4 showing another modification;

FIGURE 6 is a view similar to FIGURES 4 and 5 and showing another modification;

FIGURE 7 is an enlarged sectional view, showing a still further modification;

FIGURE 8 is a section taken substantially on line 8—8 of FIGURE 7;

FIGURE 9 is an enlarged vertical sectional view similar to FIGURES 4–7, showing a further embodiment of the invention;

FIGURE 10 is a fragmentary view similar to FIGURE 1 showing an embodiment incorporating inner peripheral expansion grooves; and FIGURE 11 is a section taken substantially on the plane of line 11—11 of FIGURE 10.

The novel brake drum will be mounted on a vehicle wheel (not shown) as is conventional, and the brake shoes (shown generally in phantom lines in FIGURES 1 and 2) will be of any suitable character.

Referring to the drawings in detail, and first considering FIGURES 1–3, a one-piece, cast drum is indicated generally at 10 and comprises at one side a mounting plate portion 12 centrally apertures at 14 which may be scalloped as shown, or comprise a circle. The mounting plate 12 has extending therethrough circumferentially spaced openings 16, and the aperture 14 is surrounded by a reinforcing bead 18 which is optional. Each of the openings 16 is surrounded by a reinforcing boss 20. The bead 18 extends radially on opposite sides of each boss 20 as indicated at 22 and an air-circulation aperture 24 is provided radially outwardly and adjacent each boss 20.

The apertures 24 communicate the interior of the drum with the exterior thereof and serve to cool the relatively thick bosses and bead portions 22.

The mounting plate 12 terminates in a laterally extending, circular collar 26 having a relatively thin cross-section, the inner surface 28 of which being engaged by conventional, circumferentially spaced and opposed, arcuate brake shoes. The collar 26 is in effect in cantilever relation to the mounting plate portion 12.

Extending radially from the outer surface 30 of the collar 26 is a plurality of transverse cooling fins 32 which serve to conduct heat from the collar 26 when it is generated in a brake application, and transfer by convection heat to the air as the drum rotates. Circumposed about the collar 26, is a circumferential, integral reinforcing "beam" indicated generally at 34 and comprising an inner, relatively thin web 36 and continuous circumferential chord 38.

The cross-section of the "beam" affords an unusual strength collar which together with the fins 32 maintains the shape of the drum against warpage and distortion when subjected to thermal expansion and contraction. The beam 34 is located inwardly of the free edge 40 of the collar 26 and will be disposed generally in substantial overlying relation to a plane passing through the center of maximum internal pressure applied by the brake shoes, as shown by phantom lines in FIGURE 2.

The fins 32 together with the webs 36 will conduct and dissipate heat away from the area in which maximum braking force is obtained and the fins are tapered at 42 away from the beam and merging generally at 44 into the peripheral edge of the mounting flange 12. The webs 32 extend from the beam 34 toward the free edge 40 of the collar 26 having an arcuate edge 46 merging into the free edge 40.

The major portion of heat generated during a prolonged braking operation will be conducted through the relatively thin collar 26 to the radially extending vanes 32 and be dissipated by convection and conduction. Additionally, the vanes 32 will resist transverse bending, and the circumferential or reinforcing "beam" 34 provides maximum structural strength through the use of minimum amount of material. The web 36 rapidly conducts heat away from the collar 26.

Referring to FIGURES 7 and 8, the brake drum 10' includes a collar 26 including the previously described transverse vanes 32 and a slightly modified reinforcing beam 34'. The reinforcing beam 34' includes a web 36' and a chord 38'.

The beam 34' functions in the same manner as that previously described; however, the web 36' of the beam 34' includes between adjacent vanes 32, optional transverse apertures 50 which would aid to dissipate heat, i.e., by convection.

Referring to FIGURE 4, a fragmentary portion of a brake drum, similar to that previously described, is indicated generally at 10", this drum including on the collar 26, vanes 32, similar to those previously described.

The drum includes a circumferential "beam" 34" which includes a web 36" and a relatively wide chord 38". This beam 34" provides in addition to increased area to dissipate heat, greater strength to resist distortion.

Considering FIGURE 5, a fragmentary portion of a brake drum is indicated generally at 100 and includes a collar indicated at 26. The drum 100 includes a plurality of radially extending, transverse vanes 32 and the circumferential "beam" indicated generally at 134 has an L-shaped cross-section. The "beam" 134 includes a web 136 and chord 138. Referring to FIGURE 6, a fragmentary portion of a drum, similar to that of FIGURE 5, is indicated generally at 100'. This embodiment includes a collar 26 having a plurality of radially extending, transverse vanes 32 and a circumferentially disposed "beam" 134' which includes a web 136' and chord 138'. The chord 138', it will be noted, extends in a direction opposite to the direction of the chord 138 shown in FIGURE 5.

Referring to FIGURE 9, there is shown a portion of a brake drum 200 including a collar 26. The drum 200 includes a plurality of radially extending transverse vanes and the circumferential "beam" indicated generally at 234 has a T-shaped cross-section. The "beam" 234 includes a web 236 and chord 238. The circumferential grooves 240, 242 formed beneath the chord 238 has a U or V shaped cross-section and facilitate the casting of the drums at these particular portions of the brake drums.

In all of the embodiments, the structural cross-sections of the "beams" 34, 34', 34", 134, 134' and 234 provide considerable external strength and rigidity to the drum, provide increased surface exposure for dissipating heat generated within the drum, permit increased strength in relation to weight of the drums to permit the use of relatively thin walls, and the use of thin walls provides more rapid heat conductivity to reduce brake "fade" and increase efficiency.

In FIGURES 10 and 11 there is disclosed a modified embodiment of the invention shown in FIGURES 1 and 2. Reference characters are used in FIGURES 10 and 11 to identify similar parts.

The embodiment of FIGURES 10 and 11 includes in spaced circumferential relation a plurality of inwardly opening grooves 26'.

When a brake application is made utilizing the drum of FIGURES 10 and 11, assuming that the cooling apertures 24, fins 32 and beam 34 are omitted, an extreme heat will occur due to the frictional engagement between the brake shoes and inner surface of the drum. The sudden heat causes expansion of the brake drum, and since the inner surface is heated before the outer surface of the drum, extreme internal stresses occur within the drum metal.

In order to allow to a degree for internal expansion and afford interior cooling, the grooves 26' compensate for differences between internal and external expansion and provide a cooler operating drum.

With the presence of the fins 32, holes 24 and structural beam 34, the brake drum is extremely "cool running" and has greater than expected strength as well as compensating for internal stresses and preventing brake drum distortion.

The foregoing is to be considered as illustrative only of the principles of the invention. Further, since numerous modifications and changes will readily occur to those skilled in the art, the invention is not limited to the exact construction, and all modifications and equivalents may be resorted to, as fall within the scope of the defined claims.

What is claimed as new is as follows:

1. A brake drum for use with brake shoes, said drum comprising a one-piece body member including a mounting plate and a cylindrical collar extending laterally from the upper edge thereof, said collar including a plurality of circumferentially spaced vanes extending radially from the outer surface of said collar, and a circumferential "beam" circumposed about the outer surface of said collar, intermediately of said vanes, said "beam" including a thin web portion integral with opposite sides of said vanes and a continuous chord portion transversely of said web portion at the outer edges of said vanes whereby said chord is maintained relatively cooler than said web and collar to restrain expansion of said collar during a brake application.

2. The structure of claim 1; said web portion of said "beam" including at least one transverse aperture disposed between a pair of adjacent vanes.

3. The structure of claim 1; said "beam" having a T-shaped cross-section.

4. The structure of claim 3; said T-shaped cross-section including a web having opposed arcuate side portions.

5. The structure of claim 3; the chord of said "beam" being of greater width than the depth of said web.

6. The structure of claim 1; said "beam" having an L-shaped cross-section.

7. The structure of claim 1; said mounting plate including a central aperture therethrough, said mounting plate comprising a relatively thin cross-section.

8. The structure of claim 7; said mounting plate including a plurality of circumferentially spaced transverse apertures inwardly of the margin of said central aperture.

9. The structure of claim 8; said mounting plate including second transverse apertures extending therethrough adjacent to and radially spaced outwardly from said first mentioned transverse apertures.

10. A brake rum as set forth in claim 1, said collar includes a plurality of cricumferentially spaced, inwardly opening groove portions extending the width of said collar and normal to said mounting plate for compensating for internal brake drum surface expansion and promoting cooling thereat.

11. The structure of claim 10 wherein said "beam" includes at least one transverse aperture intermediately of an adjacent pair of said vanes.

References Cited in the file of this patent

UNITED STATES PATENTS

| | | |
|---|---|---|
| 1,865,311 | Goostray | June 28, 1932 |
| 1,972,251 | Udale | Sept. 4, 1934 |
| 1,990,746 | Nelson | Feb. 12, 1935 |
| 2,055,244 | Wells | Sept. 22, 1936 |
| 2,088,191 | Eksergian | July 27, 1937 |
| 2,702,613 | Walther | Feb. 22, 1955 |